United States Patent
Schroeder et al.

(10) Patent No.: US 9,354,988 B2
(45) Date of Patent: May 31, 2016

(54) ALLOCATION STRATEGIES FOR DATA STORAGE APPLICATIONS

(75) Inventors: Axel Schroeder, Sinsheim (DE); Ivan Schreter, Malsch (DE); Dirk Thomsen, Heidelberg (DE)

(73) Assignee: SAP SE, Walldorf (DE)

( * ) Notice: Subject to any disclaimer, the term of this patent is extended or adjusted under 35 U.S.C. 154(b) by 1300 days.

(21) Appl. No.: 13/073,653

(22) Filed: Mar. 28, 2011

(65) Prior Publication Data

US 2012/0254579 A1 Oct. 4, 2012

(51) Int. Cl.
G06F 12/02 (2006.01)
G06F 11/14 (2006.01)
G06F 3/06 (2006.01)

(52) U.S. Cl.
CPC ............ G06F 11/1474 (2013.01); G06F 3/064 (2013.01); G06F 3/0611 (2013.01); G06F 3/0619 (2013.01); G06F 3/0644 (2013.01); G06F 3/0689 (2013.01); G06F 2201/80 (2013.01)

(58) Field of Classification Search
CPC ............... G06F 12/0246; G06F 2003/0694; G06F 9/5016; G06F 2212/2022; G06F 2212/7201; G06F 3/064; G06F 3/061; G06F 3/0626; G06F 12/02; G06F 12/0223; G06F 12/023; G06F 12/0802; G06F 2212/653; G06F 3/0644
USPC ......... 711/103, 129, 152, 153, 170, 171, 173, 711/E12.008, E12.002, E12.084
See application file for complete search history.

(56) References Cited

U.S. PATENT DOCUMENTS

| | | | | |
|---|---|---|---|---|
| 4,751,727 | A * | 6/1988 | Brahm et al. .................... | 379/28 |
| 6,539,464 | B1 * | 3/2003 | Getov ............................ | 711/170 |
| 6,738,884 | B1 * | 5/2004 | Greicar ......................... | 711/173 |
| 7,389,395 | B1 * | 6/2008 | Garthwaite et al. .......... | 711/165 |
| 8,533,410 | B1 * | 9/2013 | Corbett et al. ................ | 711/162 |
| 2002/0004894 | A1 * | 1/2002 | Hostetter ....................... | 711/170 |
| 2003/0028739 | A1 * | 2/2003 | Li et al. ........................ | 711/170 |
| 2005/0216691 | A1 * | 9/2005 | Michael ................ | G06F 12/023 711/170 |
| 2008/0195810 | A1 * | 8/2008 | Wu et al. ....................... | 711/114 |
| 2009/0031100 | A1 * | 1/2009 | Hansen ......................... | 711/171 |
| 2010/0174876 | A1 * | 7/2010 | Kasahara et al. ............. | 711/154 |
| 2011/0029717 | A1 * | 2/2011 | Moshayedi ......... | G06F 12/0246 711/103 |
| 2011/0072194 | A1 * | 3/2011 | Forhan .................... | G06F 13/14 711/103 |
| 2011/0145484 | A1 * | 6/2011 | Agarwal et al. ............... | 711/103 |
| 2011/0225359 | A1 * | 9/2011 | Kulkarni ............... | G06F 3/0607 711/114 |
| 2012/0060012 | A1 * | 3/2012 | Olszewski .......... | G06F 12/1009 711/171 |
| 2012/0089803 | A1 * | 4/2012 | Dice ................... | G06F 12/0223 711/171 |

* cited by examiner

Primary Examiner — Tuan Thai
Assistant Examiner — Edward Waddy, Jr.
(74) Attorney, Agent, or Firm — Mintz Levin Cohn Ferris Glovsky and Popeo, P.C.

(57) ABSTRACT

A physical storage volume can be partitioned into a plurality of master blocks of an equal master block size. Each master block of the plurality of master blocks can be allocated for storage of a single storage page size of a plurality of predefined storage page sizes provided for storage of data by a data storage application. A received page size can be determined for a storage page designated by the data storage application for storage on the physical storage volume, and the storage page can be stored in a free block of a master block of the plurality of master blocks having the single page size equivalent to the received page size. Related methods, systems, and articles of manufacture are also disclosed.

20 Claims, 4 Drawing Sheets

ALLOCATION STRATEGIES FOR DATA STORAGE APPLICATIONS

TECHNICAL FIELD

The subject matter described herein relates to optimizing performance in database systems and other computing environments in which data are written and/or read from a storage medium or storage device.

BACKGROUND

Storage pages can be used in association with a data storage application that writes and/or reads data from a persistency layer that can include active data stored in fast but relatively expensive memory that is in turn written to a less expensive storage for longer term retention. The persistence layer can ensure that changes made within the data storage application are durable and that the data storage application can be restored to a most recent committed state after a restart. A committed state is achieved by writing the changes made to data in the persistence layer to the longer term storage. Data are stored in the longer term storage are organized in storage pages, a term that refers to a unit of physical storage.

SUMMARY

In one aspect, a method includes partitioning a physical storage volume into a plurality of master blocks of an equal master block size. Each master block of the plurality of master blocks is allocated for storage of a single storage page size of a plurality of predefined storage page sizes provided for storage of data by a data storage application. A received page size is determined for a storage page designated by the data storage application for storage on the physical storage volume, and the storage page is stored in a block of a master block of the plurality of master blocks having the single page size equivalent to the received page size.

In some variations one or more of the following features can optionally be included in any feasible combination. The data storage application can include at least one of a database application and a network-attached storage system. The equal master block size can be an even multiple of each of the plurality of predefined storage page sizes. The method can further include one or more of generating a global block index of the block to a master block index and a page size, generating a local master block index identifying a block location within a master block of the plurality of master blocks, and changing the single storage page size for which a master block of the plurality of master blocks is allocated to a second single storage page size after all blocks in the master block have been deallocated. The local master block index can be defined as the global block index divided by a number of blocks in the master block.

One or more implementations of the current subject matter can include features that provide certain advantages, examples of which can include but are not limited to reducing fragmentation within a storage volume, even when storage pages of varying sizes are used by a data storage application for assigning data for storage on the storage volume.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims. For example, while the specific examples described below to illustrate features of the current subject matter make reference to the data storage application being a database, other types of data storage applications are within the scope of the current subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
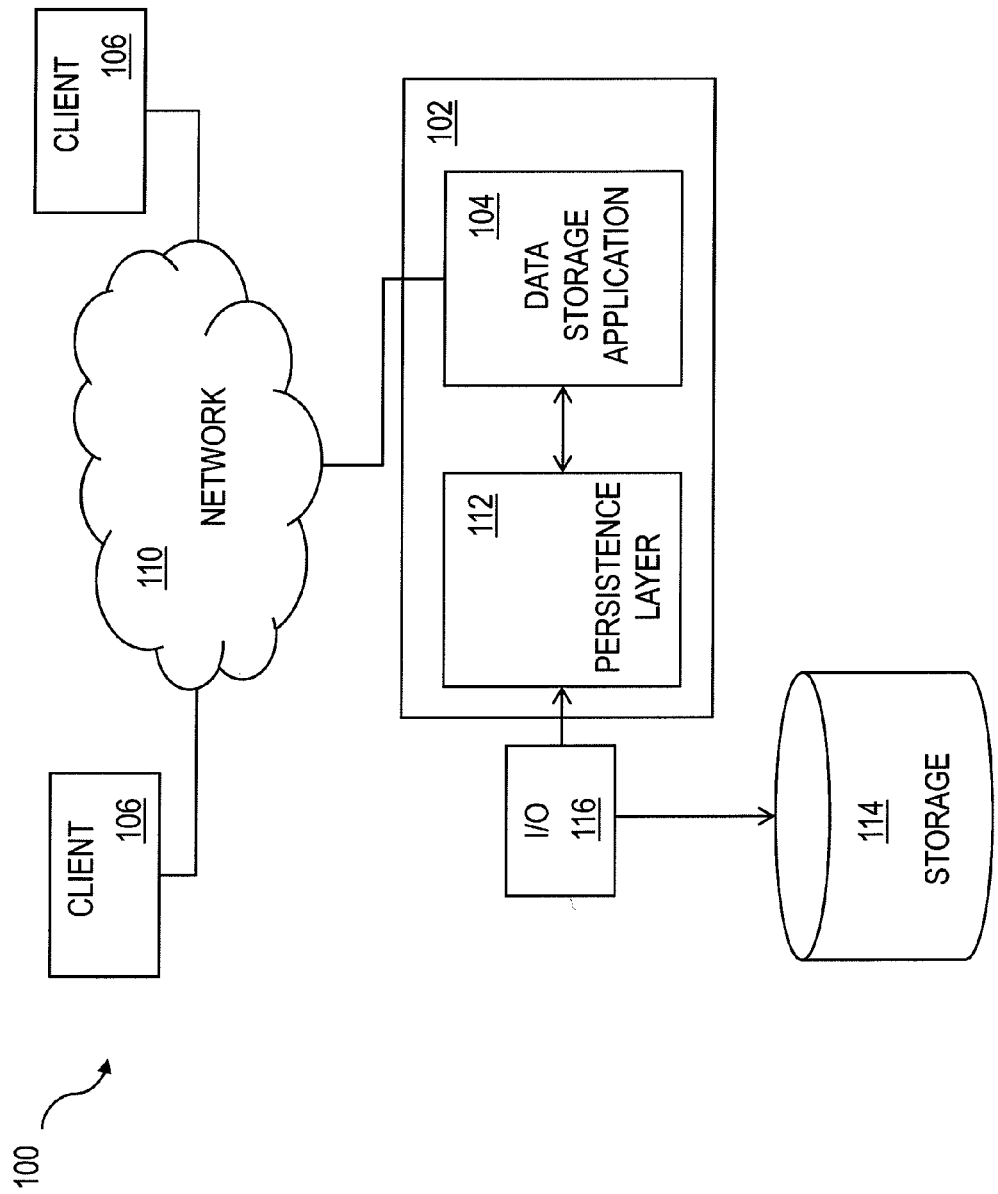
FIG. 1 is a box diagram illustrating aspects of a system at least some of whose features are consistent with implementations of the current subject matter.

FIG. 1 shows an example of a system 100 in which a computing system 102, which can include one or more programmable processors that can be collocated, linked over one or more networks, etc., executes one or more modules, software components, or the like of a data storage application 104. The data storage application 104 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 102 as well as to remote users accessing the computing system 102 from one or more client machines 106 over a network connection 110. One or more user interface screens produced by the one or more first modules can be displayed to a user, either via a local display or via a display associated with one of the client machines 106. Data units of the data storage application 104 can be transiently stored in a persistence layer 112 (e.g. in a page buffer or other type of temporary data container), which can write the data, in the form of storage pages, to one or more storages 114, for example a via an input/output component 116. The one or more storages 114 can include one or more physical storage media or devices (e.g. hard disk drives, persistent flash memory, random access memory, optical media, magnetic media, and the like) configured for writing data for longer term storage. It should be noted that the storage 114 and the input/output component 116 can be included in the computing system 102 despite their being shown as external to the computing system 102 in FIG. 1.

A typical data storage application 104 passes storage pages of a single, fixed size (e.g. 8 kB) to the input/output component 116. The content of the storage 114 can change when storage pages are written from the persistence layer 112 to the storage 114. The persistence layer 112 generally determines when a write operation occurs, for example during page replacement, when a next savepoint is written, or the like. However, the input/output component 116 generally does not possess or receive information about how the storage pages required to contain the resulting data should be logically clustered.

Thus, when a unit of related data (e.g. a database table) having a data size in excess of the single, fixed size of the storage pages is passed from the persistence layer 112 to the input/output component 116 to be written to the storage 114 in conjunction with other data, the input/output component may use multiple storage pages to accommodate all of the data within the related unit of data. However, the input/output component 116 typically does not possess or receive information about how the required storage pages should be logically clustered when they are written to the storage 114. As such, the input/output component 116 may write the several storage pages required to contain all of the data in the related unit of data to physical locations that are physically scattered throughout the storage 114. Physical scattering refers to related data being stored in non-contiguous physical blocks on the storage 114.

As update operations and other changes that cause data in storage pages used by a data storage application to be rewritten, modified, and the like, storage pages belonging logically together (e.g. because they contain a portion of data belonging to a related unit of data such as a database table) can become physically scattered within a physical storage medium. If the storage pages containing data of a related unit of data are physically scattered throughout the storage 114, higher that acceptable loads times can be required to access all of the required data for the data storage application 104 to present the related unit of data. Because storage pages belonging logically together as part of a related unit of data are often read in combination, physical scattering or dispersal of the related pages can negatively affect performance due to longer read and write times. In the example of a hard disk drive, storage of related pages in physically scattered memory blocks on the disk can require excessive movement of the drive's read/write head that can be substantially reduced if the pages were better clustered in memory blocks more closely located to one another. Improved physical clustering of the storage pages used to retain logically related data can therefore improve the performance of an input/output module 116. Such clustering can be achieved by using storage pages having a larger unit size, for example by requiring fewer total storage pages to be allocated to storage of given related unit of data. While such an approach can be useful for large related units of data, if a data storage application 104 includes storage of many units of data having sizes smaller than that of the larger storage pages, too much disk space may be wasted.

One approach to such a problem is described in co-pending and co-owned U.S. patent application Ser. No. 13/072,575, filed on Mar. 25, 2011 and entitled "Variable Page Sizing for Improved Physical Clustering", the disclosure of which is hereby incorporated by reference in its entirety. Pages sizes of a variety of sizes selected from a series of available storage page sizes can be passed to the input/output module 116 by a data storage application 104 (e.g., from 4 kB up to 16 MB, optionally in a geometric series with each successive size larger than the previous size by a constant multiplicative factor). i within one data volume. However, by using a variety of different storage page sizes, fragmentation problems may arise on the storage 114.

To address these and potentially other issues with currently available solutions, one or more implementations of the current subject matter provide methods, systems, articles or manufacture, and the like that can, among other possible advantages, reduce fragmentation of a physical storage 114 by assigning a plurality of "master blocks" of fixed size within the physical storage medium or media such that the size of each master block is an even and common multiple of each of the sizes of storage pages passed to the input/output module 116. The data volume or volumes of the storage 114 can then include one or more master blocks that each contains storage pages of the same size. Free blocks can be managed in some implementations in a two-staged process in which a global index of storage blocks is mapped to a master block index and then to a local index within a specific master block. If a master block becomes completely free (e.g. no active storage pages are stored therein), the master block can be reassigned to contain storage pages of a different page size.

Figure 2:
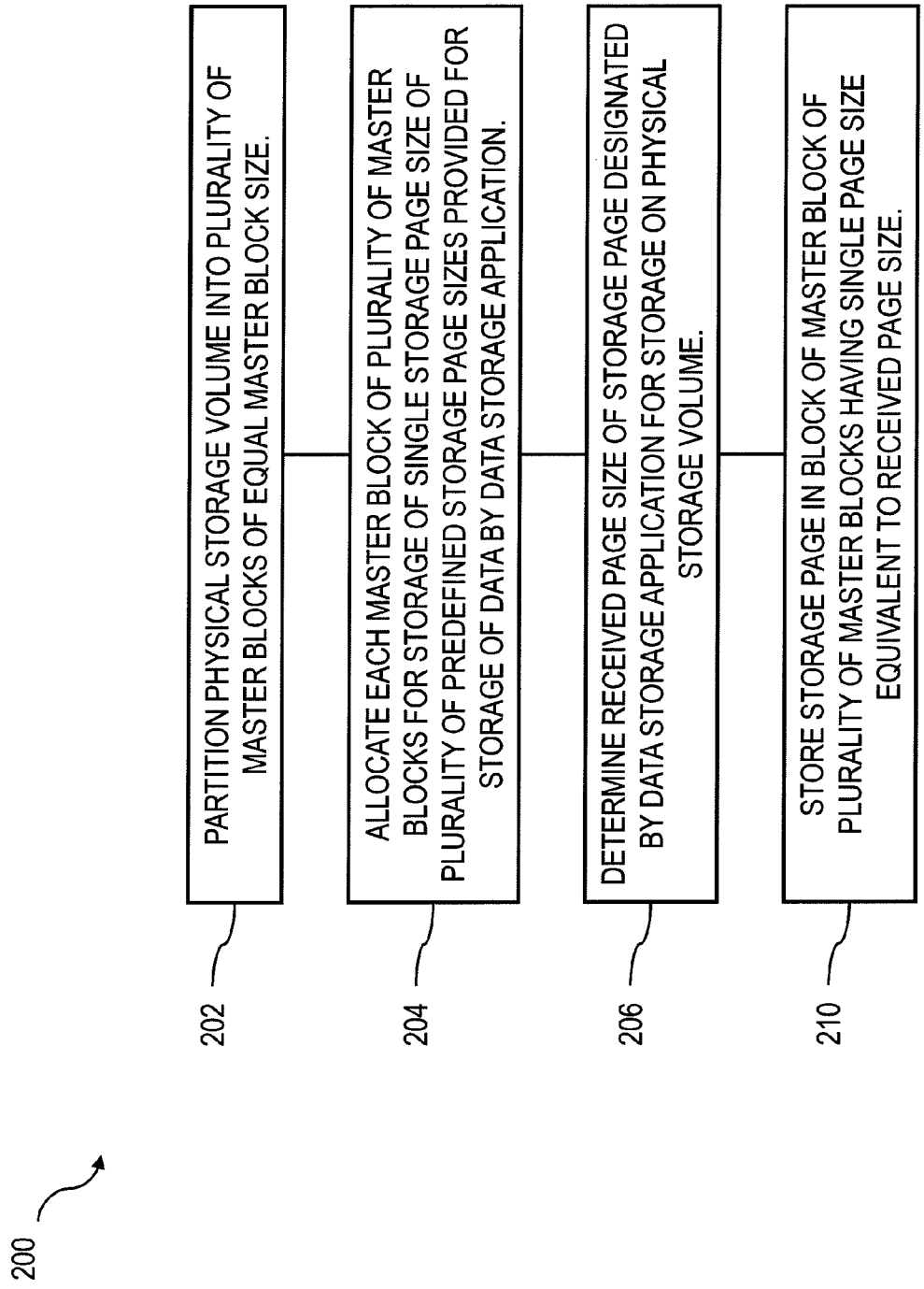
FIG. 2 is a process flow diagram illustrating features of a method consistent with implementations of the current subject matter.

FIG. 2 shows a process flow chart 200 illustrating features of a method at least some of which are consistent with an implementation of the current subject matter. At 202, a physical storage volume is partitioned into a plurality of master blocks of an equal master block size. The equal master block size can, for example, be an even multiple of each of the plurality of predefined storage page sizes from which a data storage application 104 can select for storage of data from a related unit of data. At 204, each master block of the plurality of master blocks is allocated for storage of a single storage page size of the plurality of predefined storage page sizes. After determining a received page size of a storage page designated by the data storage application for storage on the physical storage volume at 206, the storage page is stored at 210 in a block of a master block of the plurality of master blocks having the single page size equivalent to the received page size.

Figure 3:
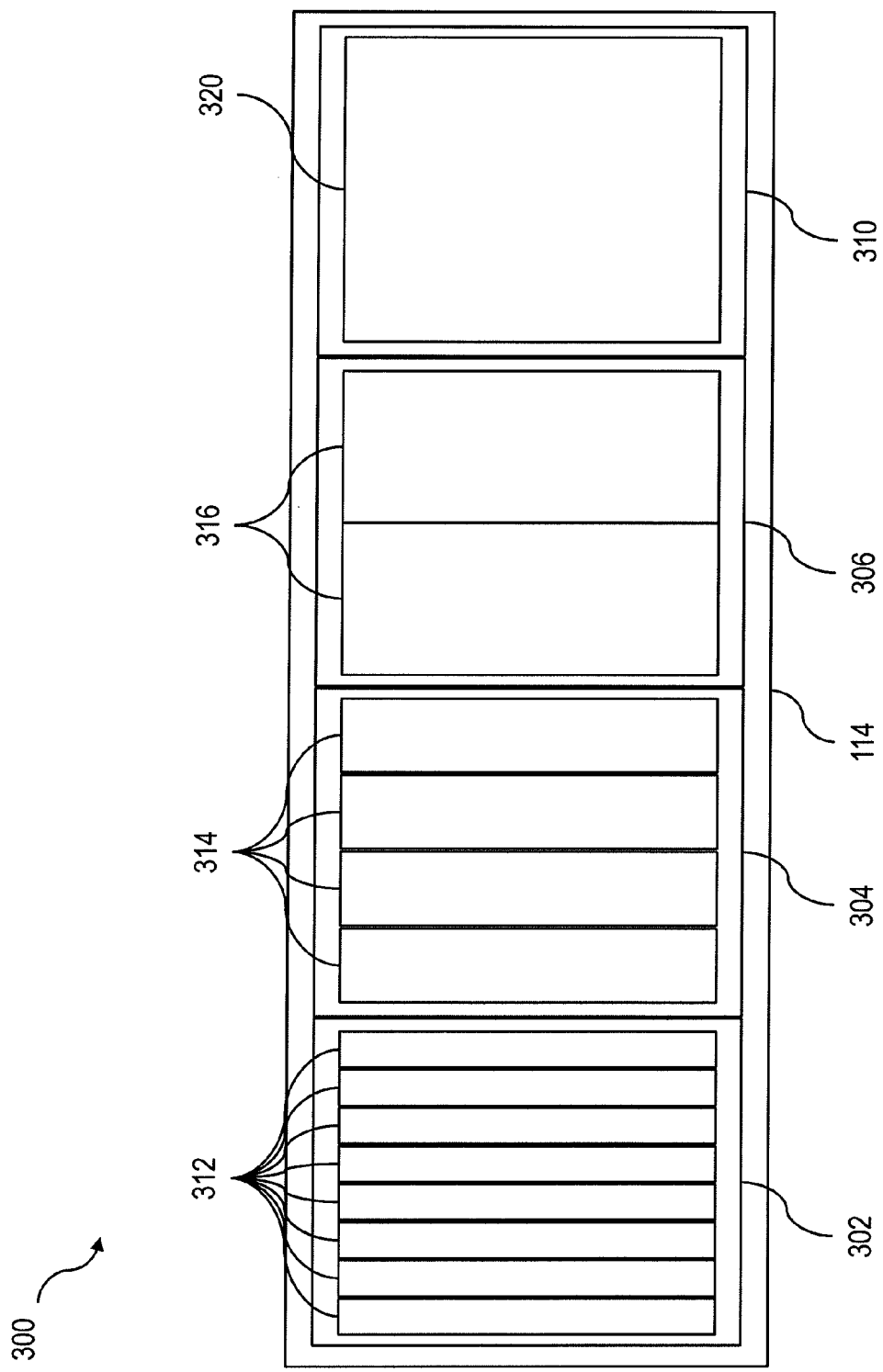
FIG. 3 is a diagram illustrating block divisions of a storage consistent with one or more implementations of the current subject matter.

FIG. 3 shows an example of portioning of a storage 114 into a plurality of master blocks of an equal size. In the example shown in the block diagram 300, the storage 114 is divided into a first master block 302, a second master block 304, a third master block 306, and a fourth master block 310, each of equal size. The first master block 302 is allocated for storage of a first single storage page size 312. The first single storage page size 312 to be stored in the first master block 302 is chosen in this example to be one eighth of the size of the equal sized master blocks. Similarly, the second master block 304 is allocated for storage of a second single storage page size 314. The second single storage page size 314 to be stored in the second master block 304 is chosen in this example to be one fourth of the size of the equal sized master blocks, or in other words, twice the size of the first single storage page size 312. The third single storage page size 316 to be stored in the third master block 306 is chosen in this example to be one half of the size of the equal sized master blocks, and the fourth single storage page size 320 to be stored in the third master block 310 is chosen in this example to be equal to the size of the equal sized master blocks. It should be noted that the example shown in FIG. 3 and explained here is intended to be illustrative and not limiting in any way. A storage 114 can be divided into any number of equal sized master blocks, and each equal sized master block can hold any number of equal sized storage pages, advantageously with a size chosen such than the master block size is a multiple of the storage page size allocated to that master block.

In an allocation strategy consistent with an implementation of the current subject matter, a first array provides a global-to-local mapping of a master block number (e.g. a master block mapping index, MIDX) of a master block allocated to a specific page size ($SIZE_{PAGE}$) and a specific local master block index (e.g. a local index, LIDX) for pages of the specific page size within the master block having a master block size ($SIZE_{MASTERBLOCK}$). For a particular page size ($SIZE_{PAGE}$), there is a second array mapping the local, page size specific master block index LIDX to a corresponding global master block number MIDX as part of a local-to-global map.

To allocate a storage page having a page size $SIZE_{PAGE}$, a global block index BIDX corresponding to a free block of $SIZE_{PAGE}$ is allocated. The block index BIDX divided by the number of pages of this particular size in the specific master block (LPPM) provides an index into a local-to-global map where $$LIDX = \frac{BIDX}{LRRP} \text{ and} \tag{1}$$

$$LPPM = \frac{SIZE_{MASTERBLOCK}}{SIZE_{PAGE}} \tag{2}$$

If there is no mapping to the global master block index (for example if the local-to-global map of this particular page size has no entry at LIDX), a new master block index MIDX is allocated (or reused) and entered into this mapping such that the local-to-global map at LIDX points to MIDX. The master block index MIDX is also added to the global-to-local map such that the global-to-local map at MIDX points to a coordinate {LIDX, $SIZE_{PAGE}$}. Alternatively, if the master block is already allocated, the master block index MIDX can be read from the local-to-global map at a position given by LIDX. The resulting physical position of the block within the storage 114 ($POS_{BLOCK}$) can be computed as $$POS_{BLOCK} = MIDX \times SIZE_{MASTERBLOCK} + [BIDX \bmod LPPM] \times SIZE_{PAGE} \tag{3}$$

where "mod" denotes the modulo operation (i.e. the remainder of the division of one number by another). The page of size $SIZE_{PAGE}$ at position $POS_{BLOCK}$ can then be used for read/write operations.

Deallocating a physical page at a position $POS_{BLOCK}$ within the storage 114 can be accomplished in some implementations by first determining the master block index MIDX as $$MIDX = \frac{POS_{BLOCK}}{SIZE_{MASTERBLOCK}} \tag{4}$$

The page size $SIZE_{PAGE}$ as well as the page-size local master block index LIDX are found in the global-to-local map at index MIDX. The block index BIDX is then computed, for example according to $$BIDX = LIDX \times LPPM + \frac{[POS_{BLOCK} \bmod SIZE_{MASTERBLOCK}]}{SIZE_{PAGE}} \tag{5}$$

The block BIDX can then be marked as unused.

For each page size $SIZE_{PAGE}$, a separate local-to-global map can provide mapping between the page-size-specific local master block index LIDX and the global master block index MIDX. A single global-to-local map can provide mapping between the global master block index MIDX and the local master block index pair of LIDX and $SIZE_{PAGE}$.

Figure 4:
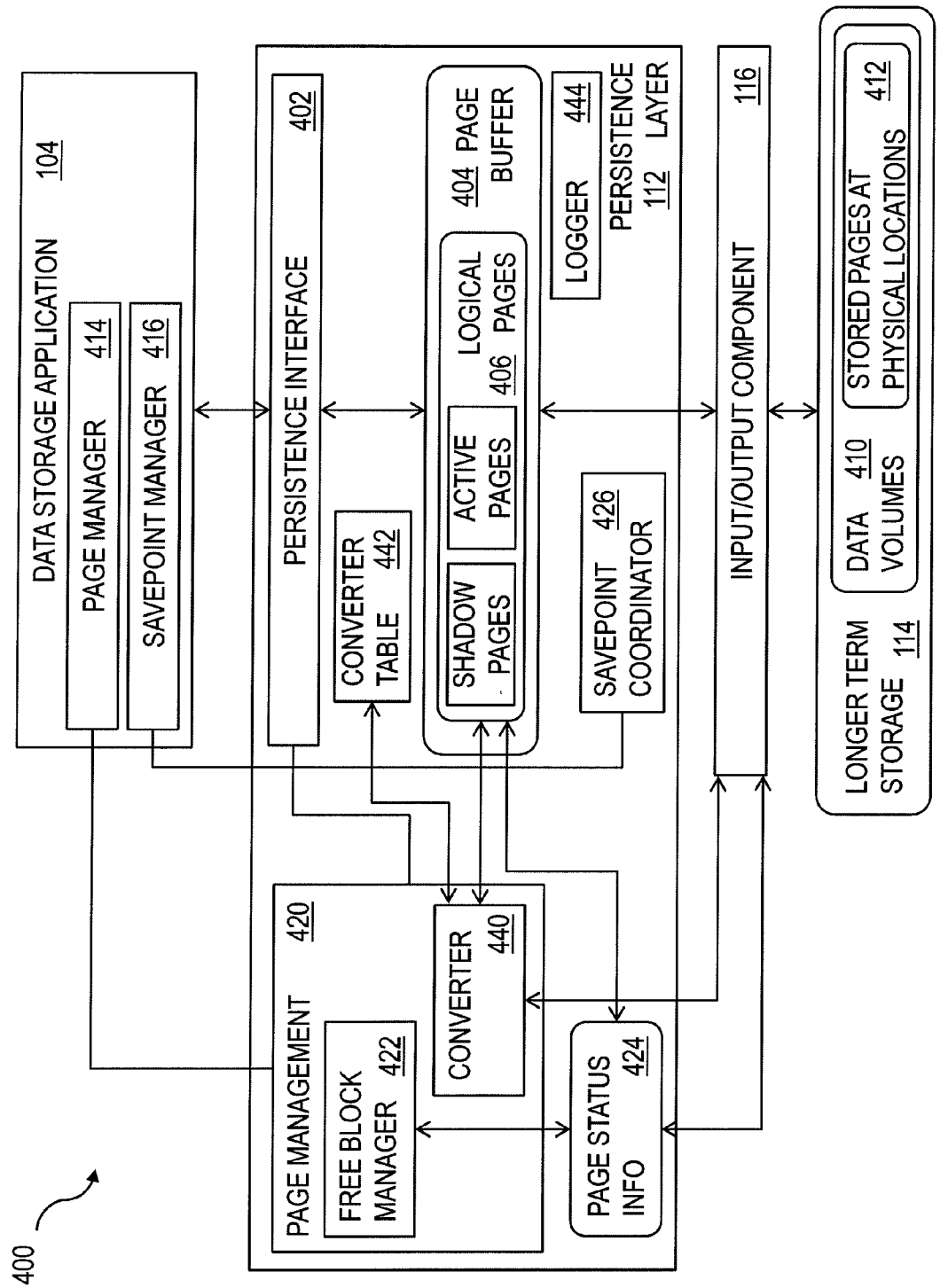
FIG. 4 is a diagram illustrating features of a system architecture at least some of whose features are consistent with implementations of the current subject matter.

FIG. 4 shows a software architecture 400 consistent with one or more features of the current subject matter. A data storage application 104, which can be implemented in one or more of hardware and software, can include one or more of a database application, a network-attached storage system, or the like. According to at least some implementations of the current subject matter, such a data storage application 104 can include or otherwise interface with a persistence layer 112 or other type of memory buffer, for example via a persistence interface 402. A page buffer 404 within the persistence layer 112 can store one or more logical pages 406, optionally can include shadow pages, active pages, and the like. The logical pages 406 retained in the persistence layer 112 can be written to a storage (e.g. a longer term storage) 114 via an input/output component 116, which can be a software module, a sub-system implemented in one or more of software and hardware, or the like. The storage 114 can include one or more data volumes 410 where stored pages 412 are allocated at physical memory blocks.

In some implementations, the data storage application 104 can include or be otherwise in communication with a page manager 414 and/or a savepoint manager 416. The page manager 414 can communicate with a page management module 420 at the persistence layer 112 that can include a free block manager 422 that monitors page status information 424, for example the status of physical pages within the storage 114 and logical pages in the persistence layer 112 (and optionally in the page buffer 404). The savepoint manager 416 can communicate with a savepoint coordinator 426 at the persistence layer 204 to handle savepoints, which are used to create a consistent persistent state of the database or other records stored by a data storage application for restart after a possible crash.

A converter 440, which can be part of or in communication with the page management module 430, can be included to track mappings between logical pages and physical pages written to the storage 114. The converter 440 can maintain a current mapping of logical pages 406 to the corresponding physical pages in a converter table. When a logical page 406 is read from storage 114, the storage page to be loaded can be looked up using the converter 440. When a logical page 406 is written to storage 114 the first time after a savepoint, a new free storage page can be assigned to the logical page 406. The free block manager 422 can mark the new storage page as "used" and the new mapping can be stored in the converter table.

In some implementations, for example as shown in FIG. 4, logical pages 406 are loaded into the page buffer 404 in memory to provide read and write access. The page buffer 404 need not have a particular minimum or maximum size, but can in some implementations use some or all free memory that is not allocated for other data or tasks. If the memory is needed elsewhere, least recently used logical pages 406 can be removed from the page buffer 404. For example, if a modified page is chosen to be removed, that logical page 406 can be saved from the persistence layer 112 to longer term storage, for example by being passed to the input/output component 116 for writing to the storage 114.

The persistence layer 112 can ensure that changes made in the data storage application 104 are durable and that the data storage application 104 can be restored to a most recent committed state after a restart. Writing data to the storage 114 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 444 can also be included to store the changes made to the data of the data storage application in a linear log. The logger component can be used during recovery to replay operations since last savepoint to ensure that all operations are applied to the data and that transactions with a logged "COMMIT" record are committed before rolling back still-open transactions at the end of a recovery process.

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A computer program product comprising a non-transitory machine-readable medium storing instructions that, when executed by at least one programmable processor, cause the at least one programmable processor to perform operations comprising:
    partitioning a physical storage volume into a plurality of master blocks of an equal master block size;
    allocating each master block, of the plurality of master blocks, for storage of a plurality of pages each having a single storage page size, of a plurality of predefined, different storage page sizes provided for storage of data by a data storage application;
    determining a page size of a received storage page designated by the data storage application for storage on the physical storage volume; and
    storing the received storage page in a block of a master block, of the plurality of master blocks, having the allocated single page size equivalent to the determined page size.

2. A computer program product as in claim 1, wherein the data storage application comprises at least one of a database application and a network-attached storage system.

3. A computer program product as in claim 1, wherein the equal master block size is an even multiple of each of the plurality of predefined storage page sizes.

4. A computer program product as in claim 1, wherein the operations further comprise generating a global block index of the block to a master block index and a page size.

5. A computer program product as in claim 4, wherein the operations further comprise generating a local master block index identifying a block location within a master block of the plurality of master blocks, the local master block index being defined as the global block index divided by a number of blocks in the master block.

6. A computer program product as in claim 1, wherein the operations further comprise changing the single storage page size for which a master block of the plurality of master blocks is allocated to a second single storage page size after all blocks in the master block have been deallocated.

7. A system comprising:
  computer hardware configured to perform operations comprising:
  partitioning a physical storage volume into a plurality of master blocks of an equal master block size;
  allocating each master block, of the plurality of master blocks, for storage of a plurality of pages each having a single storage page size, of a plurality of predefined, different storage page sizes provided for storage of data by a data storage application;
  determining a page size of a received storage page designated by the data storage application for storage on the physical storage volume; and
  storing the received storage page in a block of a master block, of the plurality of master blocks, having the allocated single page size equivalent to the determined page size.

8. A system as in claim 7, wherein the data storage application comprises at least one of a database application and a network-attached storage system.

9. A system as in claim 7, wherein the equal master block size is an even multiple of each of the plurality of predefined storage page sizes.

10. A computer program product as in claim 1, wherein the operations further comprise generating a global block index of the block to a master block index and a page size.

11. A system as in claim 10, wherein the operations further comprise generating a local master block index identifying a block location within a master block of the plurality of master blocks, the local master block index being defined as the global block index divided by a number of blocks in the master block.

12. A system as in claim 7, wherein the operations further comprise changing the single storage page size for which a master block of the plurality of master blocks is allocated to a second single storage page size after all blocks in the master block have been deallocated.

13. A computer-implemented method comprising
  partitioning a physical storage volume into a plurality of master blocks of an equal master block size;
  allocating each master block, of the plurality of master blocks, for storage of a plurality of pages each having a single storage page size, of a plurality of predefined, different storage page sizes provided for storage of data by a data storage application;
  determining a page size of a received storage page designated by the data storage application for storage on the physical storage volume; and
  storing the received storage page in a block of a master block, of the plurality of master blocks, having the single page size equivalent to the determined page size.

14. A computer-implemented method as in claim 13, wherein the data storage application comprises at least one of a database application and a network-attached storage system.

15. A computer-implemented method as in claim 13, wherein the equal master block size is an even multiple of each of the plurality of predefined storage page sizes.

16. A computer-implemented method as in claim 13, further comprising generating a global block index of the block to a master block index and a page size.

17. A computer-implemented method as in claim 16, further comprising generating a local master block index identifying a block location within a master block of the plurality of master blocks, the local master block index being defined as the global block index divided by a number of blocks in the master block.

18. A computer-implemented method as in claim 13, further comprising changing the single storage page size for which a master block of the plurality of master blocks is allocated to a second single storage page size after all blocks in the master block have been deallocated.

19. A computer-implemented method as in claim 13, wherein at least one of the partitioning, the allocating, the determining, and the storing is performed by at least one programmable processor.

20. A computer program product as in claim 1, wherein the storing the received storage page in the master block having the allocated equivalent single page size, reduces the fragmentation of the physical storage volume.

* * * * *